United States Patent [19]

Salvagnini

[11] Patent Number: 5,074,542
[45] Date of Patent: Dec. 24, 1991

[54] MANIPULATOR OF FLAT SHEET, IN PARTICULAR SHEET METAL PLATE

[75] Inventor: Guido Salvagnini, Sarego, Italy

[73] Assignee: Salvagnini Transferica S.p.A., Sarego, Italy

[21] Appl. No.: 448,295

[22] Filed: Dec. 11, 1989

[30] Foreign Application Priority Data

Dec. 15, 1988 [IT] Italy ............... 22953 A/88

[51] Int. Cl.⁵ .................................................. B65H 5/02
[52] U.S. Cl. ................................. 271/205; 226/173
[58] Field of Search ............... 271/204, 205, 206; 226/173, 172

[56] References Cited

U.S. PATENT DOCUMENTS

| | | | |
|---|---|---|---|
| 1,997,290 | 4/1935 | Barber | 271/205 |
| 3,100,637 | 8/1963 | Brown | 271/79 |
| 3,249,209 | 5/1966 | Rowe | 198/203 |
| 3,330,459 | 7/1967 | Cullen | 226/173 |
| 3,977,535 | 8/1976 | Husges | 271/205 X |
| 4,434,926 | 3/1984 | Paoli | 226/172 |
| 4,445,681 | 5/1984 | Reist | 271/204 X |
| 4,512,457 | 4/1985 | Reist | 271/205 X |

FOREIGN PATENT DOCUMENTS 2083697 12/1971 France .
2118143 7/1972 France .

Primary Examiner—Richard A. Schacher
Attorney, Agent, or Firm—Cushman, Darby & Cushman

[57] ABSTRACT

The manipulator comprises a closed-ring conveyor device, which comprises a succession of grasping organs having a fixed part and a movable part. The part of the conveyor device comprises at least one rectilinear section along which suitable assemblies act on the movable parts of grasping organs to allow the closing of same on the sheet to be manipulated.

2 Claims, 7 Drawing Sheets

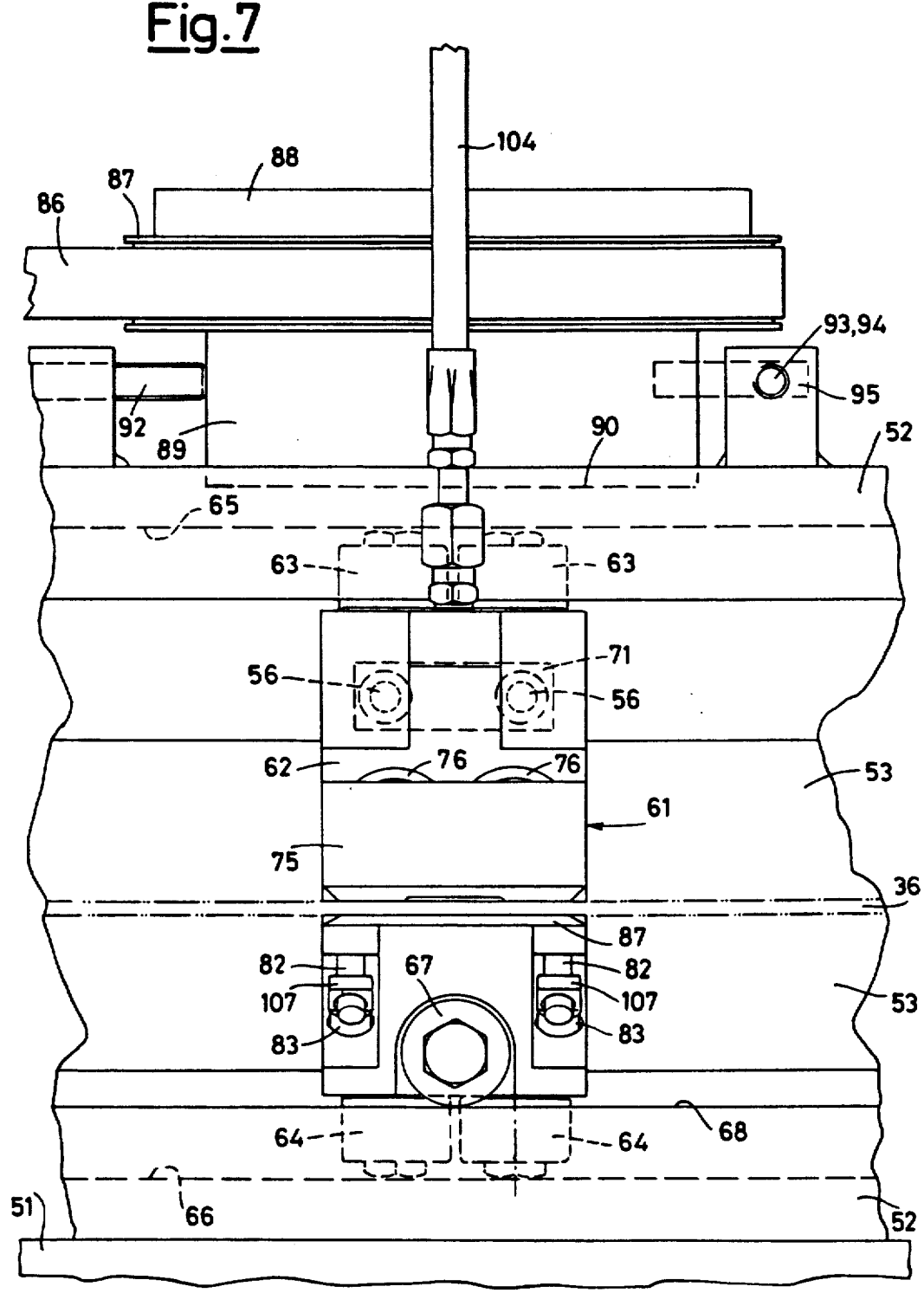

MANIPULATOR OF FLAT SHEET, IN PARTICULAR SHEET METAL PLATE

BACKGROUND OF THE DISCLOSURE

The present invention relates to a manipulator of flat sheet of any material, in particular sheet metal plate.

Manipulators are widely used in different forms in machine tools, wherein the piece being machined must in succession assume different positions in the machine itself.

Since such manipulators must exert strong accelerations to the piece being machined, their grasping organs have the form and function of clamps or pincers, capable of firmly holding the piece itself. In the case of manipulators of flat sheet, the clamps grasp the sheets in the proximity of one of their edges.

Manipulators of flat sheet are known having one or two orthogonal axes, along each of which their grasping organs are capable of accomplishing a stroke equal to the maximum stroke which the sheet must perform along that axis or to accomplish a shorter stroke along the axis which is parallel to the grasped edge and, when necessary, to execute a "repositioning", that is, temporarily abandoning the sheet, returning along that axis and regrasping the sheet and then moving forward with it again.

However, if the sheet is large or if long strokes must be accomplished, the manipulator must be of a large size, or it must execute one or more successive repositionings: in the first case it is expensive, heavy, bulky, slow and not very rigid; in the second case, time and accuracy are lost in the opening of the clamp (or clamps), in the return strokes and in reclosing the clamps.

SUMMARY OF THE INVENTION

In view of this state of the art, the object of the present invention is to accomplish a manipulator having one or two axes, of a size both small and independent of the stroke to be executed, light and rigid, capable of causing the sheet to accomplish, without repositionings, unlimited strokes along the axis parallel to the grasped edge.

According to the invention, such object is attained with a manipulator of flat sheet, characterized in that it comprises a conveyor device forming a closed ring path with at least one rectilinear section and a succession of grasping organs transported by said conveyor device along said closed ring path, said grasping organs having a fixed part integral with said conveyor device and a movable part connected to said fixed part so that it may be brought near and moved away perpendicularly to the direction of movement for the closing and opening of said grasping organs, there being provided means to control the closing of said grasping organs in said rectilinear section of said closed ring path.

In each way, each grasping organ is capable of grasping a portion of the adjacent edge of the sheet at the start of the rectilinear section of its path so as to consequently give the sheet a corresponding rectilinear movement in co-operation with the other grasping organs which at that moment are moving along the same rectilinear section. At the end of the latter, each grasping organ opens again and releases the edge of the sheet, which, however, continues to be grasped and moved by the subsequent grasping organs, which successively replace those which are starting along the return section of their closed ring path.

In this way a manipulator even of limited length, and thus light, rigid, of reduced size and not expensive, is capable of moving along a rectilinear axis flat sheets of a very great, practically unlimited, length.

A second movement along an orthogonal axis is naturally obtainable by mounting the conveyor device with its corresponding grasping organs on a carriage movable along said orthogonal axis.

BRIEF DESCRIPTION OF THE DRAWINGS

Two embodiments of the present invention will now be described in detail, as a non-limiting example, with reference to the drawings, wherein:

FIG. 7 shows a front view of a clamp from the right hand side with respect to FIG. 6.

DETAILED DESCRIPTION

Figure 1:
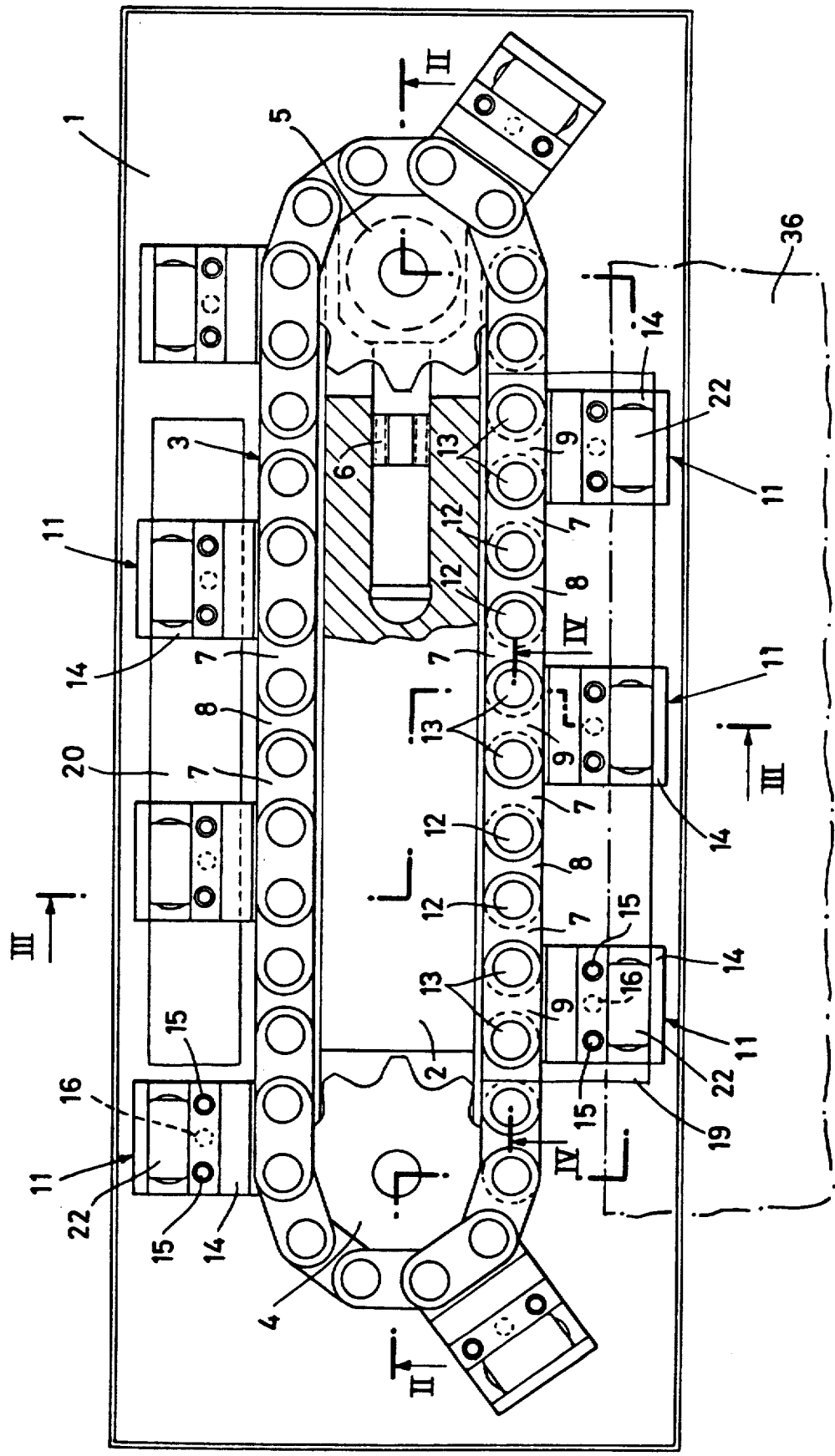
FIG. 1 is a plan view from above of a first one-axis manipulator accomplished according to the present invention.

The manipulator illustrated in FIGS. 1-4 comprises on a base 1 a main housing 2 around which there runs a chain conveyor device 3, forming a closed ring with two parallel rectilinear sections (FIG. 1) between two vertical axis pinions 4 and 5, of which the first is the driver and has a fixed axis and the second is the idler and has the axis which is movable in a direction parallel to itself in the plane wherein the two above axes lie and is urged by springs 6 so as to provide tension for the chain device 3 and to compensate for the variations in the distance between the centres of the pinions due to the motion of the chain.

Figure 2:
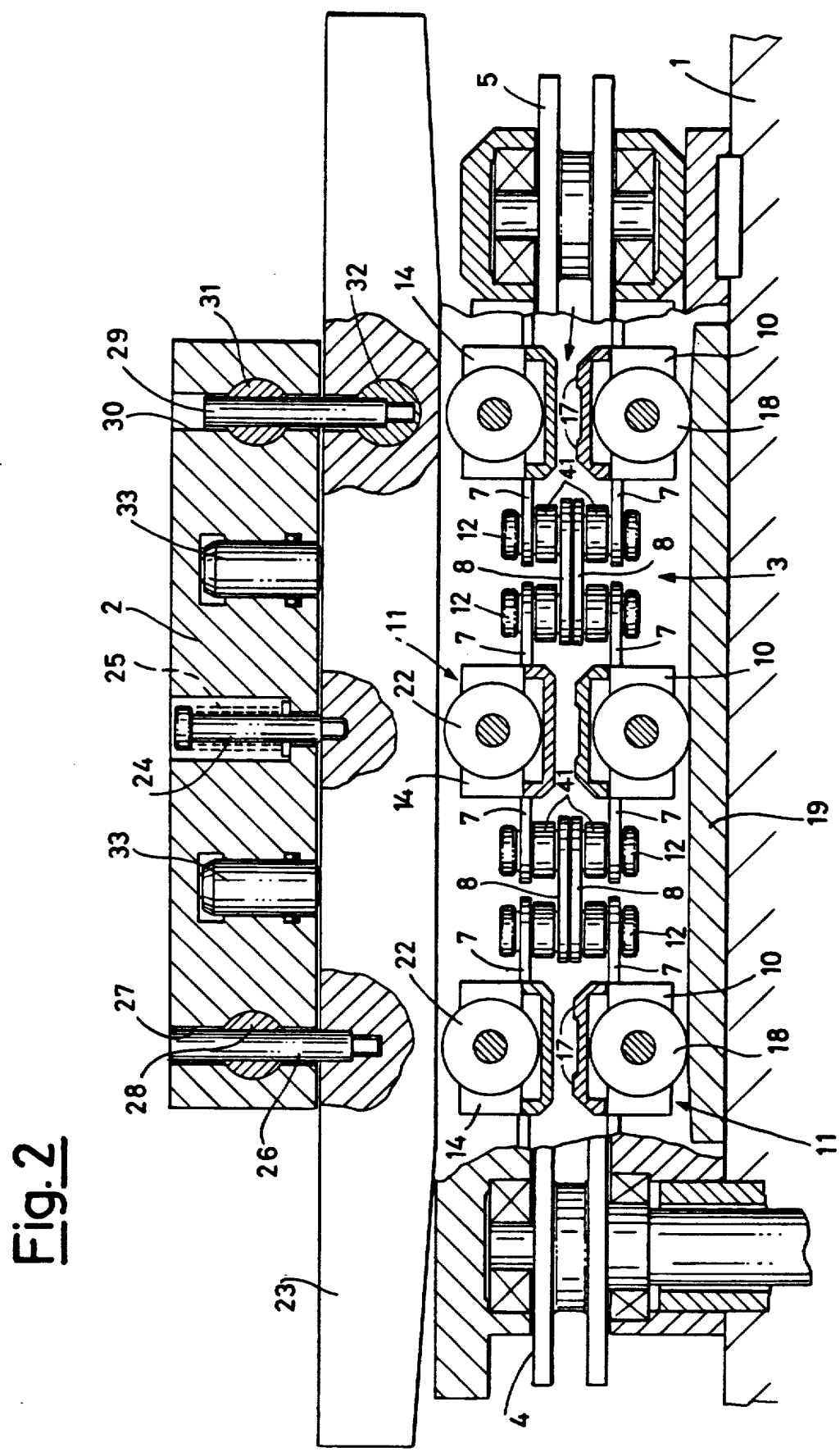
FIG. 2 is a vertical cross-sectional view of said manipulator taken along the line II—II of FIG. 1.
Figure 3:
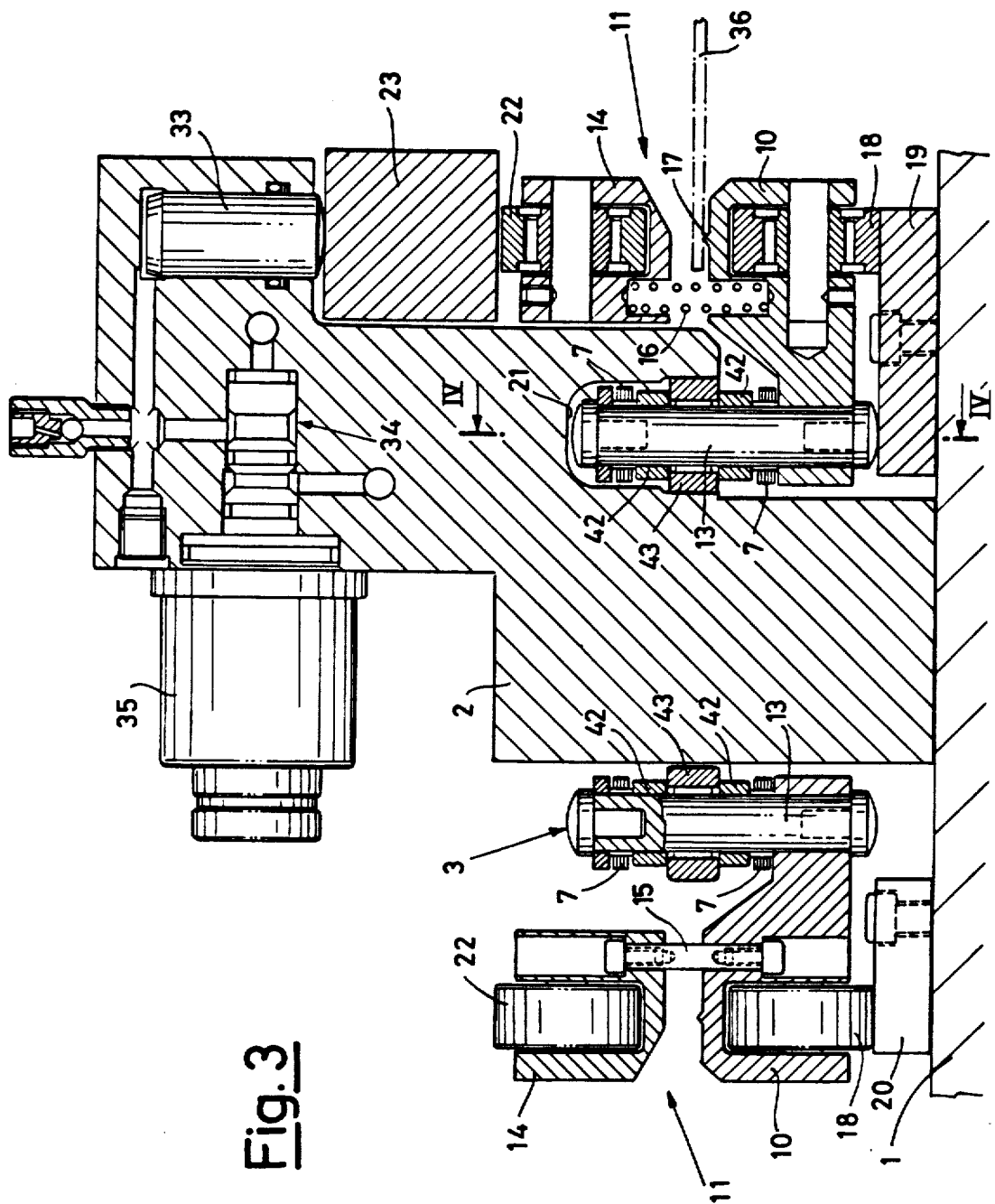
FIG. 3 shows another vertical cross-sectional view of said manipulator taken along the line III—III of FIG. 1.
Figure 4:
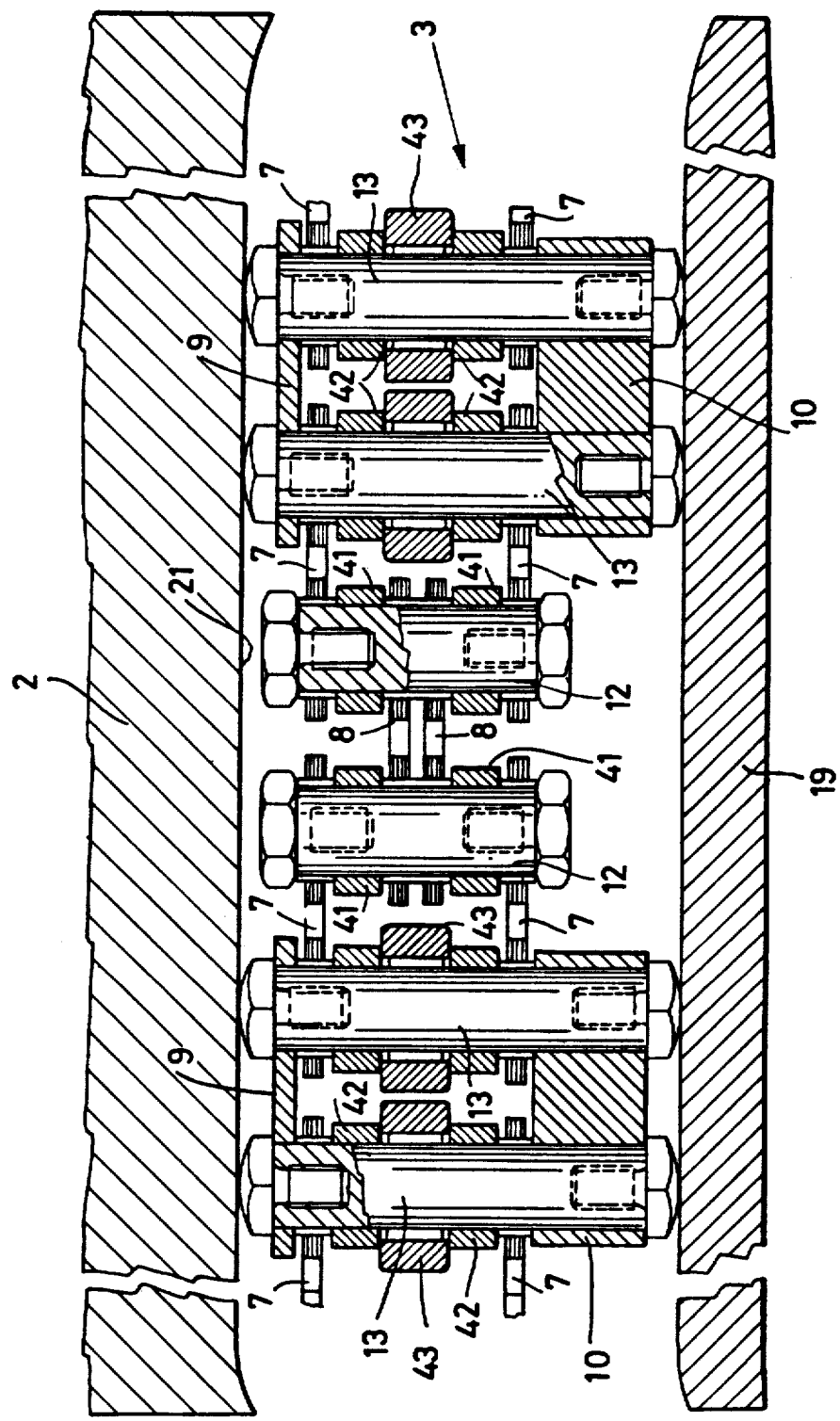
FIG. 4 shows a detail of said manipulator in a cross-sectional view taken along the line IV—IV of FIGS. 1 and 3.

The chain 3 is constituted by a succession of simple links 7 and 8, constituted by a number of thin strips packed together in bundles, alternated with complex links constituted by plates 9 and casings 10 of a succession of grasping organs or clamps 11 distributed along the chain (FIGS. 1, 3 and 4). Short 12 and long 13 pivots, alternated one with the other in pairs (FIG. 4), allow the articulation of the various links of the chain. Idle bushes 41 and 42 mounted on pivots 12 and 13 (FIGS. 2-4) accomplish the engagement of chain 3 on the teeth of pinions 4 and 5. Bearings 43 mounted on pivots 13 roll over adjacent faces of the main casing 2 (FIG. 3), discharging on them the inertia and friction forces generated by transversal movements of whatever origin.

The above casings 10 constitute the fixed jaw of grasping organs 11, which also comprise respective movable jaws 14 which may be raised and lowered with respect to the fixed jaws 10 by the sliding of pairs of connection pins 15 (FIGS. 1 and 3) against the action of springs 16 (FIGS. 1 and 3), which hold them in the position of maximum distance from the fixed jaws (FIGS. 2 and 3).

The fixed jaws 10, provided in their uppermost part with sharp projections 17 for grasping the sheet to be manipulated, move up against and slide, along the rectilinear sections of the path of chain 3, thanks to idle rollers 18, on a pair of parallel rectilinear lower cams 19 and 20 (FIGS. 1 and 3) which are in turn fixed to base 1.

On the lower cam 19, having a profile which descends at its extremities (FIG. 4), there also rests the lower head of articulation pivots 13 (FIGS. 3 and 4) for the purposes which shall be described later. The upper head of the same pivots 13 co-operates on the other hand with the summit of a rectilinear slot 21 whose extremity has a descending profile (FIG. 4), obtained in the main housing 2 (FIG. 3).

The movable jaws 14 of clamping organs 11 are in turn provided with idle rollers 22, which at one of the two rectilinear sections of the path of the chain 3 (the one above the lower cam 19) are kept by springs 16 engaged in a supporting and sliding way with an upper rectilinear cam 23 having an ascending profile at the extremities (FIGS. 2 and 3).

As shown in FIG. 2, the upper cam 23 is fixed to one or more pins 24 sliding in the upper part of the main housing 2 and held up by springs 25. In addition, cam 23 is fixed to another parallel pin 26 slidably housed in a wider rectilinear seat 27 of the main housing 2 as well as in a rotatable cylindrical joint 28. A further pin 29 slidably housed in a wider rectilinear seat 30 of the main housing 2 and in a rotatable cylindrical joint 31 is fixed to a further cylindrical joint 32 rotatably housed in cam 23.

Against the action of springs 25 cam 23 may be moved downwards by means of a plurality of small hydraulic cylinders 33 controlled by respective solenoid valves 34 provided with a controlling actuator 35 (FIGS. 2 and 3).

The operation of the manipulator illustrated in the drawings may be described as follows.

In the absence of the sheet to be manipulated, the upper cam 23 is kept by springs 25 in the raised position of FIGS. 2 and 3 and all the grasping organs or clamps 11 have their upper jaws 14 raised in the open position of the same grasping organs, independently, that is, from the fact that chain 3 is moving or is at a standstill.

Once a sheet metal plate 36 has been introduced (FIGS. 1 and 3) between the lower 10 and the upper 14 jaws of clamps 11 arranged along the rectilinear section of chain 3 included between cams 19 and 23 while the chain itself is at a standstill, cam 23 is lowered under the action of the small hydraulic cylinders 33, so as to force the upper jaws of the clamps 11 below to move downwards so as to press the sheet against the lower jaws 10 of the same clamps, thus gripping it against the sharp projections 17.

When the chain is moved by means of the motorized pinion 4, each closed clamp arrives in the proximity of the end of cam 23, where this is tapered upwards, and its upper jaw, due to the effect of spring 16, abandons contact with the sheet.

At the same time, each open clamp entering that rectilinear section works itself under cam 23, which is tapered here as well, and as a consequence its upper jaw 14 moves downwards and goes on to press against the sheet metal plate. All the clamps 11 which are below cam 23 are grasping the sheet and move it along in their rectilinear movement.

If the movement of chain 3 is reversed, since cam 23 is symmetrical, the sheet will also reverse and the clamps 11 enter the rectilinear section of their path at the point where they previously left it and vice versa.

The opening of clamps 11, that is, the raising of the upper jaws 14 with respect to the lower jaws 10, must be of a few millimeters so that the initial grasp is possible of sheet metal plates which are not perfectly flat.

For a good grasp, the lower jaws 10 are provided with sharp projections 17, so that these jaws 10 must also move away from the lower face of the sheet before abandoning the rectilinear section of their path so as to avoid scratching that face, damaging it. On the other hand, the vertical stroke of the lower jaws 10 is much smaller than that of the upper jaws 14, since it is sufficient for them to just pull away from the sheet, and this is obtained by simply exploiting the elasticity of the simple links 7 and 8 between two adjacent clamps. Such simple links are made to bend by the force applied on the clamp exiting at one or the other extremity of the rectilinear section of the path of the chain by the slot 21, which acts as a cam in co-operation with the lower cam 19, which for this purpose has a width greater than that of the other lower cam 20 (FIG. 3) located in the return part of the clamps on the other side of the main housing 2. Against the above cams 21 and 19 there slide the heads of pivots 13, constrained against the fixed jaws 10 of clamps 11. In order that said simple links 7 and 8 be at the same time flexible and capable of transmitting the necessary traction force to move large sheet plates with strong acceleration, they are, as has already been said, constituted by a number of thin strips packed together in bundles.

Since the sheet may only be partly inserted in the set of clamps arranged along the rectilinear section along which closing cam 23 acts on the upper jaws of the clamps themselves, the small hydraulic cylinders 33 which press cam 23 up against the small rollers 22 of upper jaws 14 are preferably supplied with oil coming from as many solenoid valves as there are clamps engaged in the rectilinear section, and each of said solenoid valves 34 puts its small cylinder 33 under pressure only if the upper jaw of the clamp below is up against a sheet metal plate.

So that cam 23 may adapt to differences in thickness of the sheet and to the dimensional differences of the individual clamps 11, it is free, in addition to translate vertically, also to rotate round cylindrical joints 28 and 31, exploiting for this purpose the greater amplitude of seats 27 and 30 with respect to sliding pins 26 and 29 (FIG. 2). In this way the cam itself is allowed to assume different inclinations thanks to the differences in sliding actions of pins 26 and 29 around the axis of joints 28 and 31.

Figure 5:
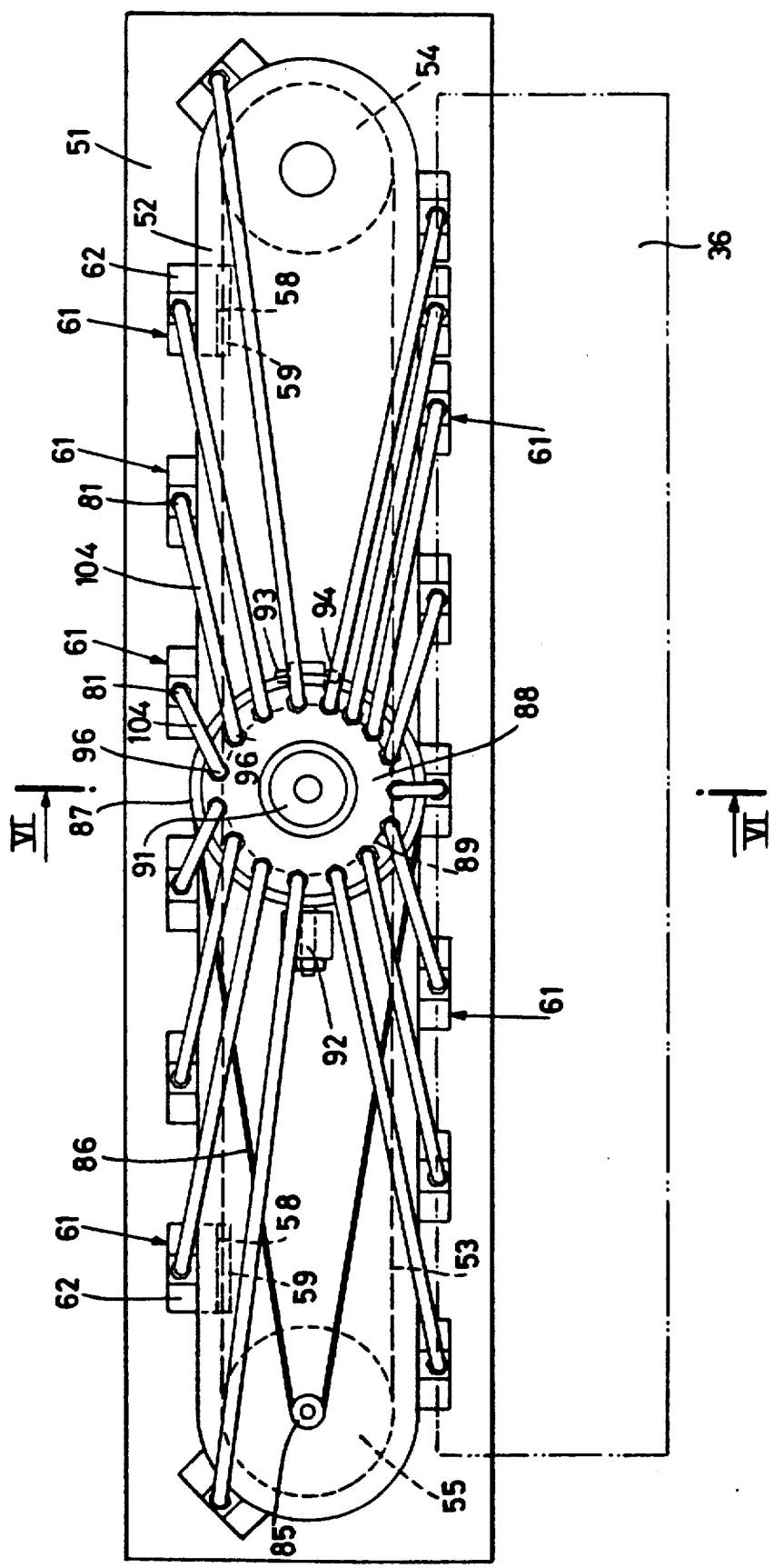
FIG. 5 shows a plan view from above of a second one-axis manipulator accomplished according to the present invention.
Figure 6:
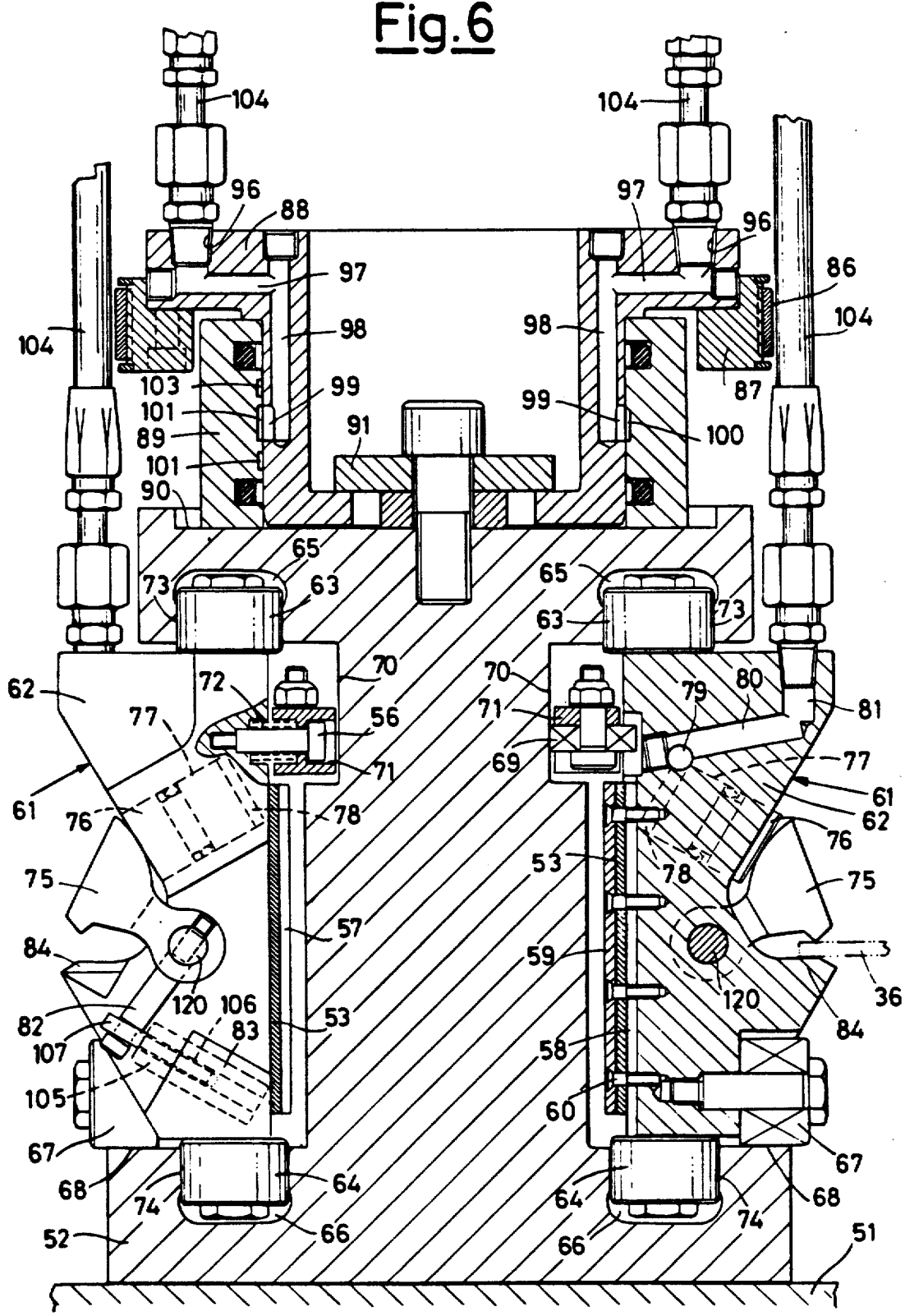
FIG. 6 shows a vertical cross-sectional view of said second manipulator taken along the line VI—VI of FIG. 5.

The manipulator illustrated in FIGS. 5, 6 and 7 comprises on a base 51 a main housing 52 around which there runs a belt conveyor device 53, forming a closed ring with two parallel rectilinear sections (FIG. 5) between two vertical-axis pinions 54 and 55, of which the first is the driver and has a fixed axis and the second is the idler and has the axis which is movable in a direction parallel to itself in the plane wherein the two above axes lie and is operated by known means to give tension to belt device 53.

Belt 53 is of the type having internal teeth 57 (FIG. 6), so that its motion is perfectly synchronous with the motion of driving pinion 54. In addition to internal teeth 57, facing the pinions, belt 53 is provided with a certain number of external teeth 58 on its opposite face, equidistant one from the other, but with a longer pitch than that of teeth 57. Teeth 58 are used to anchor to belt 53 an equal number of grasping organs or clamps 61 (FIGS. 5, 6 and 7).

Each clamp 61 is constituted by a housing 62, anchored to belt 53 by means of a tooth 58 and a metal tooth 59, replacing tooth 57 of the belt, opposite tooth 58, being the tooth 59 traversed by bolts 60 which bite into housing 62 and hold the belt tightly between tooth 59 and the housing itself (FIG. 6).

At the upper and lower extremities of each housing 62 there are rotatably hinged two rollers 63 and two rollers 64 having a vertical axis, rolling in grooves 65 and 66 respectively of the main housing 52. At the lower extremity of each housing 62 there is also rotatably hinged a horizontal-axis roller 67, rolling on a track 68 of the main housing 52. Rollers 63 and 64 support the horizontal forces applied to clamp 61 and roller 67 supports the weight of clamp 61 itself. A vertical-axis roller 69, rolling on a track 70 of the main housing 52, is rotatably hinged on a small block 71 guided by two horizontal cylindrical pins 56 implanted in housing 62 of clamp 61, which block 71 is urged towards track 70 by two springs 72 resting against housing 62. This roller 69 has the function, co-operating with springs 72, of urging rollers 63 and 64 against the external faces 73 and 74 of grooves 65 and 66.

On each housing 62 there is hinged at 120 a jaw 75 of clamp 61, on which there act two pistons 76 of hydraulic cylinders 77 obtained in the same housing 62 (in recess 78) having parallel and side-by-side axes. Recesses 78 of cylinders 77 communicate with the outside of clamp 61 by means of holes 79, 80 and 81. Two pivots 82 integral with jaw 75 are urged by springs 83 in such a direction as to move jaw 75 away from a counter jaw 84 belonging to housing 62 and to move back pistons 76 in their seats 77. Between springs 83 and pivot 82 there is placed a piece 105 which is slipped with one of its cylindrical parts 106 into spring 83 and with one of its bored parts 107 on pivot 82; this piece 105 ensures the constant positioning of spring 83 with respect to pivot 82 even during rotation around the hinge of jaw 75.

Coaxial with the driving pinion 54 and intergral with it there is a pinion 85 (FIG. 5), which by means of toothed belt 86 transmits motion to a pulley 87 integral with a flanged bush 88, rotatable in a bush 89 located at the centre of the oblong ring formed by belt 53. The two bushes 88 and 89 may slide in a way parallel to their axis on a horizontal face 90 of the main housing 52, but are held in a precise position by a ring 91, which prevents its movement away from face 90, by a screw 92, which tightens belt 86, by belt 86 itself and by coaxial and opposite screws 93 and 94, which, by acting on a pin 95 implanted in bush 89, prevents its rotation around its vertical axis (FIG. 7).

Along the periphery of the upper face of the flanged bush 88 there are made as many threaded holes 96 as there are clamps 61 integral with belt 53. Each hole 96 through holes 97, 98 and 99 ends up on the external cylindrical face of bush 88. On the internal cylindrical face of bush 89, which coincides with the external cylindrical face of bush 88, there are obtained two grooves 100 and 101 not communicating with one another, the first extending to just under the semicircumference of the internal face of bush 88 facing one of the two rectilinear sections of belt 53 and the second extending to just over the semi-circumference facing the opposite rectilinear section. The groove 100 is in communication with a source of oil under pressure and the groove 101 is in communication with an oil tank not under pressure. The assembly 88, 89 thus operates as a rotating distributor which alternately connects holes 96 with either a supply or a discharge of oil.

A given hole 99, if bush 88 rotates in bush 89, remains for just under half a revolution in communication with groove 100, and can thus receive oil under pressure, and for just over half a revolution in communication with hole 101, and can thus allow oil to flow towards the tank. Auxiliary grooves 103 diametrically opposed to groove 100, in communication with the latter but not reachable by holes 99, ensure a balance of the hydraulic forces acting on rotating bush 88, allowing for its easy rotation.

Each hole 96 is connected by means of flexible hose 104 to hole 81 of the corresponding clamp 61. Holes 96 and 81 connected by hose 104 are in the same succession along the periphery of bush 88 and along the set of clamps 61 anchored to belt 53, respectively.

The transmission ratio between pinion 85 and pulley 87 is such that bush 88 completes one revolution for each revolution of belt 53 and thus holes 96 and 81 connected together chase one another during the synchronous motion of bush 88 and belt 53, alternately getting closer to and moving away from one another and thus causing hose 104 to bend, but without ever twisting said hose 104. It follows that the movable jaw 75 of each clamp 61 forcefully approaches its respective counter-jaw 84, urged by its respective pistons 76 at the start of one of the two rectilinear sections of its path, because along that section its hydraulic cylinders 77 are in communication through conduits 79, 80, 81, 104, 96, 97, 98, 99 with groove 100 which is under pressure, and moves away from it under the action of springs 83 at the end of that section, because said communication closes and the communication is, on the other hand, opened between cylinders 77 and groove 101 which discharges the pressure.

By turning screws 93 and 94, it is possible to adjust the points of starting and ending for closing clamps 61, by altering the peripheral position of grooves 100 and 101 of bush 89.

When pressure from groove 100 is removed, all clamps remain open and the sheet to be manipulated (36) may be introduced into the jaws.

The unit described above, completed with motor, codifier and driving and control units, may constitute a first axis of a two-axes manipulator, the other orthogonal axis being accomplished with known means.

It appears obvious that the manipulator according to the invention is lighter and less bulky than any other known manipulator with long-stroke clamps. At the same time stops and repositionings are not necessary because the sheet metal plate is always grasped by the clamps, whatever its stroke and its dimensions.

I claim:

1. A manipulator of flat sheets, comprising: a conveyor device forming a closed ring path with at least one rectilinear section; and
    a succession of grasping organs transported in a direction of movement along said path by said conveyor device along said closed ring path;
    said grasping organs having a fixed part integral with said conveyor device and a movable part connected to said fixed part so that said movable part may be brought closer to and moved away from perpendicularly to said direction of movement for the closing and opening of said grasping organs;

there being provided means for controlling the closing of said grasping organs in said rectilinear section of said closed ring path;

said conveyor device being constituted by a belt to which there are fastened at preset intervals supporting casings of said grasping organs;

said supporting casings each include a portion defining said fixed parts of said grasping organs, and rotatably support said movable parts of said grasping organs;

said means to control the closing of said grasping organs comprising respective cylinder-piston assemblies supported by said supporting casings and operating on the movable parts of said grasping organs, flexible hydraulic connections between said cylinder-piston assemblies, and a rotating distributor which, executing one rotation for each revolution of the belt at the rectilinear section of said closed ring path, puts into communication said flexible hydraulic connections with a supply of oil under pressure.

2. The manipulator according to claim 1, further including:

a fixed housing;

guide means provided to guide movement of the supporting casings with respect to said fixed housing;

said guide means comprising upper and lower idle rollers with respective vertical axes rotatably supported by the casing and rolling in respective upper and lower grooves formed in the fixed housing.

* * * * *